UNITED STATES PATENT OFFICE.

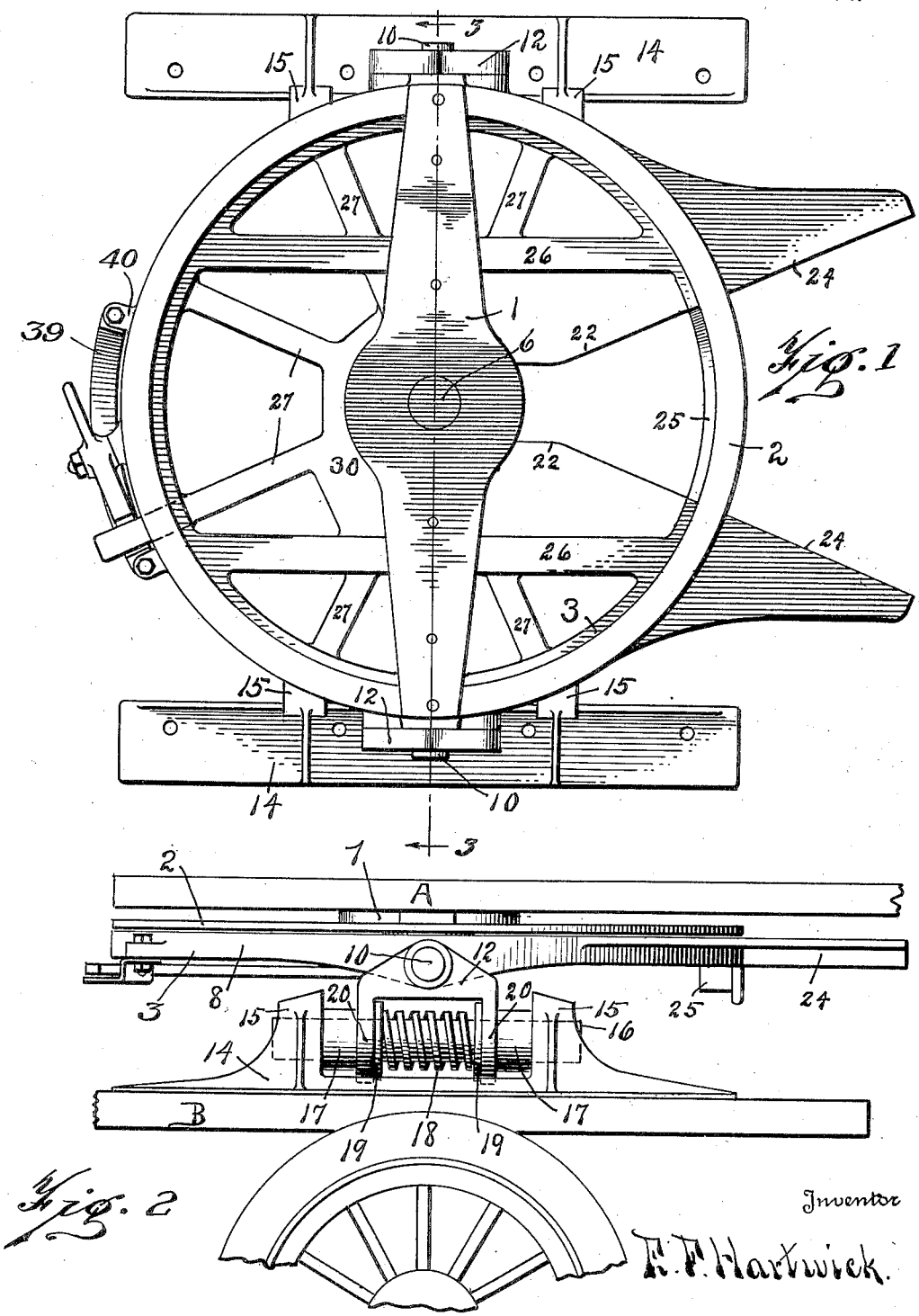

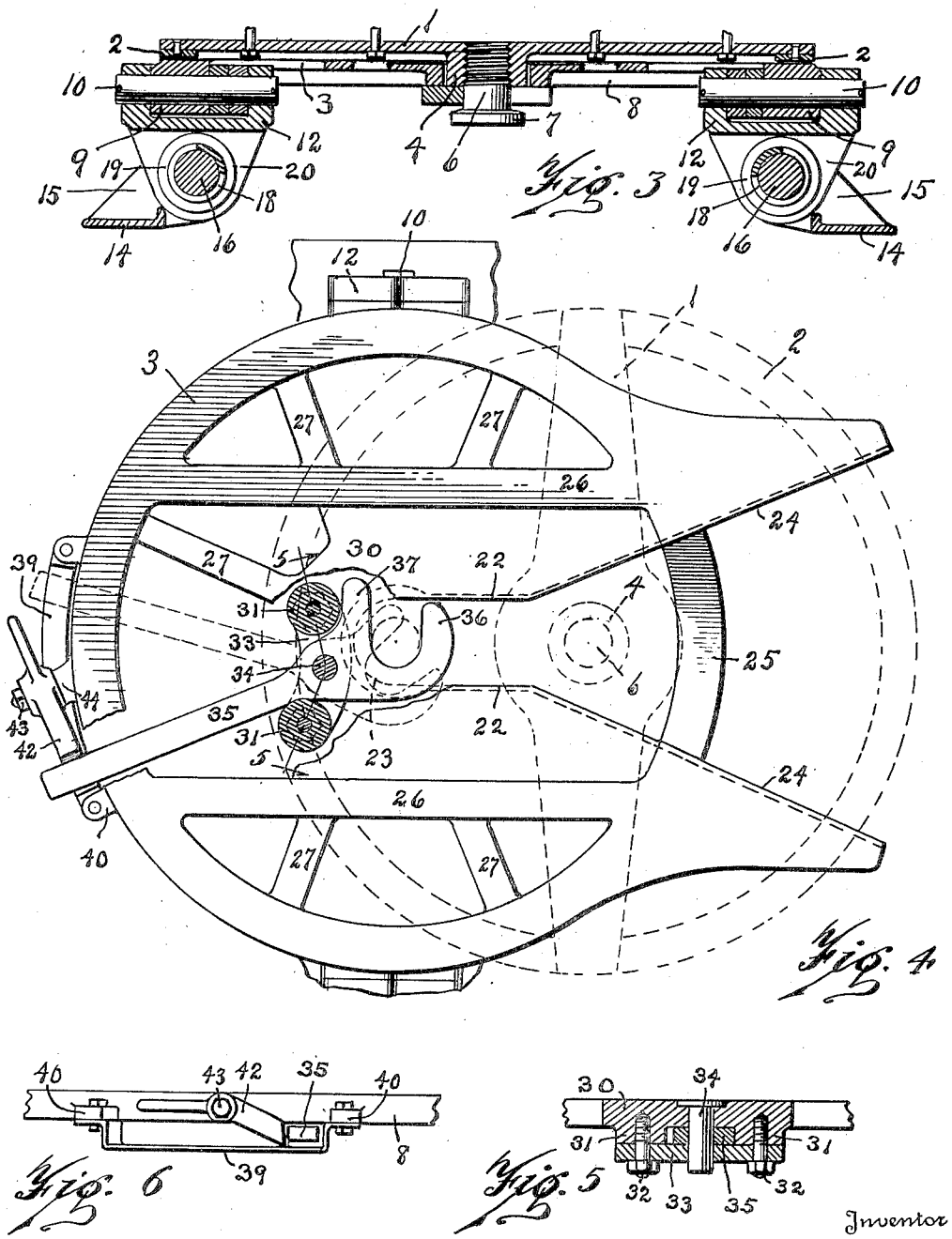

ERNEST F. HARTWICK, OF DETROIT, MICHIGAN, ASSIGNOR TO FRUEHAUF TRAILER COMPANY, OF DETROIT, MICHIGAN, A CORPORATION OF MICHIGAN.

FIFTH-WHEEL.

1,351,245.   Specification of Letters Patent.   Patented Aug. 31, 1920.

Application filed December 24, 1919. Serial No. 347,206.

*To all whom it may concern:*

Be it known that I, ERNEST F. HARTWICK, a citizen of the United States, and residing at Detroit, in the county of Wayne and State of Michigan, have invented a new and Improved Fifth-Wheel, of which the following is a specification.

This invention relates to the connecting devices between automotive tractors and two-wheeled trailers, sometimes called semi-trailers, and its object is to provide a novel fifth wheel and a simple, strong, self-closing locking device whereby the trailer may be secured to the tractor.

This invention consists in a fifth wheel structure embodying an upper circular member adapted to be secured to the trailer body and a downwardly extending king-bolt, a circular lower member connected to the tractor and on which the upper circular member is adapted to turn and provided with a semi-circular seat to receive a hub on the upper member, a locking member pivoted on the lower circular member and adapted to engage the king-bolt, and means to retain the locking member in position.

It also consists in a pair of stirrups pivotally connected to the lower circular member, a pair of pedestals mounted on the tractor, parallel shafts carried by the pedestals, a pair of sleeves on each shaft, and a spring on each shaft to hold the sleeves normally separated, said stirrups having downwardly extending flanges formed with holes to receive said sleeves and slidable thereon, said stirrups being held in central position by the springs.

It further consists of the details of construction illustrated in the accompanying drawings and particularly pointed out in the claims.

In the drawings, Figure 1 is a plan of this improved fifth wheel construction. Fig. 2 is a side elevation thereof. Fig. 3 is a section on the line 3—3 of Fig. 1. Fig. 4 is a plan of the lower circular bearing member and the locking device mounted thereon. Fig. 5 is a section on the line 5—5 of Fig. 4. Fig. 6 is an elevation of the locking dog.

Similar reference characters refer to like parts throughout the several views.

Short powerful tractors are being increasingly employed in connection with two-wheeled trailers of great carrying capacity, a single tractor being found sufficient for a number of trailers, particularly where the trailers are loaded and unloaded by hand and when they are to remain loaded at rest for any length of time. The connection between the tractors and trailers must be very strong and be readily detachable and attachable, as well as yield to sudden excessive stresses.

The upper member of the present fifth-wheel structure, which is connected to the lower side of the trailer body A, is a cross-bar 1 to which is connected a rim 2 which rests and is rotatable on the ring 3 carried by the tractor. The cross-bar 1 has a downwardly extending hub 4 from which extends the king-bolt 6 which has a head 7.

The lower portion of this fifth-wheel structure comprises the rim 3 just referred to which has a downwardly extending flange 8, having diametrically opposed bosses 9 in which are mounted the alined pins 10. Mounted on these pins are the stirrups 12. Mounted on the bed or body B of the tractor are two pedestals 14 having brackets 15 through which the shafts 16 extend parallel to each other. On each shaft are two sleeves 17, held apart by the spring 18. The sleeves have circumferential flanges 19 which engage the inner faces of the two cheeks 20 of the stirrups 12. Forward movement of the stirrups relative to the tractor will cause the stirrups to move the rear sleeves forward and thus compress the springs. A sudden forward jerk of the tractor will cause the forward sleeves 17 to be moved rearwardly and thus also compress the springs. It will thus be seen that any sudden increases in pulls of the tractor or jars will be absorbed by these springs 18.

The ring 3 is interrupted and its spider embodies the guides 22 which extend rearwardly from the semi-circular seat 23 for the hub 4, the portions 24 of these guides being at a considerable angle to each other. A depressed brace 25 extends across between these guides and completes the circle of the ring 3.

A pair of longitudinal bars 26 extend across the lower bearing ring 3 and are in the same plane therewith, but the braces 27 and guides 22 are somewhat lower. When the tractor is backed under the trailer, the outer ends 24 of the guides 22 will overbalance the ring 3 so that this structure will be inclined. The ring 2 of the upper member will therefore slide on the bars 26 and soon tilt the lower ring 3 back to horizontal position, the hub 4 on this upper member sliding along between the guides 22 until it reaches in the semi-circular seat 23 illustrated in dotted lines in Fig. 4.

Extending down from the spider 30 of the lower ring are two bosses 31 which receive the screws 32 that hold the short plate 33 in position. A pin 34 extends down through the spider and this plate 33 and on it is mounted a locking bar 35 having the locking jaws 36 and 37 at its inner end, which jaws are adapted to engage the king-bolt 6 when the bar has been swung to the position shown in Fig. 4, and lock the several parts of the fifth-wheel together.

When it is desired to disengage the trailer from the tractor, any suitable device is employed to take the weight of the front end of the trailer and the bar 35 is swung to the position indicated in dotted lines in Fig. 4, which releases the king-bolt and permits the tractor to be moved from beneath the trailer.

The bar 35 is supported at its outer end by a guide bar 39, carried by the lugs 40 on the flange 8 on the lower member of the fifth-wheel, and a dog 42, mounted on the bolt 43 carried by a boss 44 on this flange 8 normally holds the bar in locking position. But the dog can be lifted out of the path of this bar 35 whenever the trailer is to be uncoupled.

It will be seen by the dotted lines in Fig. 4 that the king-bolt will engage the jaw 37 on the locking bar as the tractor is being backed under the trailer and cause the locking bar to be swung from the position shown by these dotted lines to the position shown in solid lines.

The details and proportions of this fifth-wheel structure may all be changed by those skilled in the art without departing from the spirit of my invention as set forth in the following claims.

I claim:—

1. In combination, a circular member having a pair of alined pins, stirrups mounted thereon and comprising a pair of spaced cheeks, a pair of pedestals adapted to be mounted on the body of a tractor and provided with upright brackets, short shafts mounted in the brackets in planes at right angles to the alined pins, a spring on each shaft, said cheeks extending down between the ends of the springs and the pedestals and inclosing said springs, and means mounted on a trailer adapted to engage said circular member.

2. In combination in a tractor and trailer connecting apparatus, an upper circular fifth-wheel member attached to the trailer and having a depending king-bolt, a coöperating circular lower member adapted to be connected to the tractor and a locking device for the king-bolt mounted thereon, a pedestal on each side of the tractor embodying upwardly extending brackets and a shaft mounted in the brackets, a pair of sleeves on each shaft, a spring on each shaft between said sleeves, alined pins mounted on said lower circular member, and a stirrup on each of said pins having two downwardly extending flanges in engagement with the sleeves on one of said shafts, one of said flanges being positioned at each end of the spring on the adjacent shaft.

3. In an apparatus for connecting tractors and trailers, the combination of a plate adapted to be secured to the trailer and a hub on said plate, a ring connected to said plate and a king-bolt extending down from the hub, a second ring and a spider therefor and means on the tractor to yieldingly support said second ring, said second ring formed with an opening to admit the hub and king-bolt on the first ring, a locking bar pivoted on the second ring and having a pair of rigid jaws to engage the king-bolt, and means to prevent the locking bar from swinging.

4. In an apparatus for connecting tractors and trailers, the combination of a plate adapted to be secured to the trailer and a hub on said plate, a ring connected to said plate and a king-bolt extending down from the hub, a second ring and a spider therefor and means on the tractor to yieldingly support said second ring, said second ring formed with an opening to admit the hub and king-bolt on the first ring, and a locking bar pivoted on the second ring and having two rigid jaws adapted to extend across said opening to lock the king-bolt in position, said locking bar being swung from and to locking positions by the pressure of the king-bolt on the jaws of the locking bar.

5. In an apparatus for connecting tractors and trailers, the combination of a circular member having radial pins diametrically opposite each other, a pair of pedestals each having a pair of vertical brackets, a shaft carried by each pair of brackets, a pair of sleeves mounted on each shaft and a spring between each pair of sleeves, and a stirrup for each pedestal having portions slidable with the sleeves against the force of the spring, said stirrups being mounted on the pins carried by said circular member, a second circular member mounted on the trailer, and means to connect said circular members.

6. In combination, a pair of pedestals adapted to be mounted on the body of a tractor and each provided with a pair of upright brackets, a shaft mounted in each pair of brackets, a spring mounted on the middle portion of each shaft, a circular member having a pair of alined pins at right angles to the shafts, and a stirrup on each shaft having cheeks extending between the ends of the springs and the brackets supporting the shafts.

7. In combination, a pair of pedestals adapted to be mounted on the body of a tractor and each provided with a pair of upright brackets, a shaft mounted in each pair of brackets, a spring mounted on the middle portion of each shaft, a circular member having a pair of alined pins at right angles to the shafts, a stirrup on each shaft having cheeks extending between the ends of the springs and the brackets supporting the shafts, and a sleeve slidable on each shaft between the ends of the springs and the brackets on the pedestals, said cheeks on the stirrups being provided with apertures to receive the sleeves.

ERNEST F. HARTWICK.